United States Patent [19]

Fry

[11] Patent Number: 4,565,612

[45] Date of Patent: Jan. 21, 1986

[54] PROCESS FOR REDUCING SULPHATE ION CONCENTRATION IN AQUEOUS SODIUM HYDROXIDE SOLUTIONS

[75] Inventor: David L. Fry, Lake Jackson, Tex.

[73] Assignee: The Dow Chemical Company, Midland, Mich.

[21] Appl. No.: 680,016

[22] Filed: Dec. 10, 1984

[51] Int. Cl.$^4$ ................................................ C25B 1/16
[52] U.S. Cl. ..................................... 204/98; 210/702; 210/723; 210/767
[58] Field of Search .................. 204/98, 128; 210/702, 210/714, 723, 767

[56] References Cited

U.S. PATENT DOCUMENTS

| | | | |
|---|---|---|---|
| 1,308,509 | 7/1919 | Riiber | 204/98 |
| 2,753,242 | 7/1956 | Davis | 204/98 |
| 2,902,418 | 9/1959 | Burns | 204/98 |
| 3,017,245 | 1/1962 | Goodenough | 204/98 |
| 3,423,187 | 1/1969 | Goodenough | 23/296 |
| 3,515,513 | 6/1970 | Parsi | 204/98 |
| 3,970,528 | 7/1976 | Zirngiebl et al. | 204/98 |
| 3,998,709 | 12/1976 | Winkler | 204/98 |
| 4,078,978 | 3/1978 | Zirngiebl | 204/98 |
| 4,277,447 | 7/1981 | Chambers et al. | 204/98 |
| 4,323,436 | 4/1982 | Itoi et al. | 204/98 |
| 4,323,437 | 4/1982 | Mucenieks | 204/98 |
| 4,337,126 | 6/1982 | Gilligan, III et al. | 204/98 |
| 4,445,987 | 5/1984 | Benedetto | 204/98 |
| 4,488,949 | 12/1984 | Lee et al. | 204/98 |

FOREIGN PATENT DOCUMENTS

| | | | |
|---|---|---|---|
| 49-27278 | 7/1974 | Japan | 204/98 |
| 0047576 | 4/1981 | Japan | 204/98 |

OTHER PUBLICATIONS

Chemical Abstracts, vol. 44, p. 920.
Chemical Abstracts, vol. 48, pp. 3131, 9172.

*Primary Examiner*—Andrew H. Metz
*Assistant Examiner*—Terryence Chapman
*Attorney, Agent, or Firm*—J. H. Dickerson

[57] ABSTRACT

A process is disclosed for reducing sulphate ion concentration in an aqueous solution comprising sodium hydroxide. The process comprises adding sodium carbonate or bicarbonate to said aqueous solution to form an insoluble sodium carbonate-sodium sulphate double salt, removing said insoluble salt, and recovering a purified aqueous sodium hydroxide solution.

4 Claims, No Drawings

PROCESS FOR REDUCING SULPHATE ION CONCENTRATION IN AQUEOUS SODIUM HYDROXIDE SOLUTIONS

BACKGROUND OF THE INVENTION (1) Field of the Invention

The present invention relates to the purification of aqueous solutions of sodium hydroxide such as are obtained as products of the electrolysis of sodium chloride.

(2) Description of the Prior Art

Alkali metal hydroxides such as sodium hydroxide are generally produced by the electrolysis of salt brines, such as sodium chloride solutions in electrolytic cells. These solutions also contain a substantial amount of alkali metal chloride and alkali metal sulphate, for instance sodium chloride and sodium sulphate, as contaminating impurities. A typical cell effluent from the electrolysis of sodium chloride will contain about 8 to about 12 percent by weight of sodium hydroxide, about 17 percent sodium chloride, and about 0.2 to about 1.5 percent by weight sodium sulphate with the balance as water. At higher concentrations of sodium sulphate some reduction occurs in the particle size of the sodium chloride, as is well known. For instance, at a concentration of 4 to 7% sodium sulphate, the sodium chloride is obtained at a particle size of about 200 to about 270 microns, while at a concentration of 2% sodium sulphate, the sodium chloride is obtained at a particle size of about 300 to about 330 microns. The sodium sulphate is not affected by the electrolytic action which takes place in the electrolytic cell and remain in solution and continues to build up where the sodium hydroxide solution is recycled through the electrolytic cell. The increasing concentration of sodium sulphate can have a deteriorating effect on the graphite electrodes in the cell.

Procedures for removing sodium sulphate from sodium hydroxide solutions are known. The sodium hydroxide solution cell effluent can be directed to a series of evaporator tanks where the solution is concentrated by steam evaporation such as to a concentration of about 20 to about 35 percent by weight of sodium hydroxide at which concentration both sodium chloride and sodium sulphate contained in the solution will crystallize out of the solution. The resulting slurry is then directed to a flat bed filter where the mother liquor is extracted under vacuum and the remaining salt mass is washed and purged with water to separate the sodium chloride from the sodium sulphate so that the sodium chloride solution can be recycled through the cell system.

In another method of separating sodium sulphate from a sodium hydroxide aqueous solution, a hot caustic electrolytic cell effluent solution having a concentration of about 20 to 35 percent by weight of sodium hydroxide is directed from an evaporator to a heat exchanger where it is cooled to a temperature of about 0° C. At this temperature and concentration, a portion of the sodium sulphate will precipitate out of the solution as sodium sulphate decahydrate. The solution remaining after the first precipitation is recycled back to the evaporator for further concentration and return to the heat exchanger where it is again cooled to precipitate additional sodium sulphate.

Both of these procedures involve a series of time-consuming steps and a substantial amount of costly equipment and therefore to make the production of purified sodium hydroxide more commercially feasible a genuine need exists for a simpler and more efficient method for removing the sodium sulphate impurity from sodium hydroxide aqueous solutions. The solution disclosed in U.S. Pat. No. 3,423,187 is the precipitation of the sulphate ion from the aqueous sodium hydroxide solution following the addition of anhydrous ammonia in either a gaseous or liquid form. In this process the ammonia is dissolved in a sodium hydroxide aqueous solution having a concentration of up to about 50 percent by weight. The pressure factor is of particular importance to this method of purifying the sodium hydroxide solution since the more concentrated sodium hydroxide solutions are known to exhibit a relatively low solubility for ammonia at atmospheric pressure. It will therefore be appreciated that such a system of purification, which generally involves the use of pressurized vessels, is still complex and a simpler and more efficient method for removing sulphate ion impurities in aqueous sodium hydroxide solutions is needed.

The formation of double salts of sodium carbonate and sodium sulphate is disclosed in Chemical Abstracts, Vol. 44, page 920 and Vol. 48, pages 3131 and 9172. The double salt is identified as burkeite ($2Na_2SO_4 \cdot Na_2CO_3$) on page 3131. There is no indication that the particle size of burkeite is such that it can be more easily removed from aqueous slurries as compared to particles of sodium sulphate.

U.S. Pat. No. 4,277,447 is of interest in disclosing a method for reducing calcium ion concentrations in alkali metal chloride brines by the formation of an insoluble calcium salt upon the addition of an alkali metal carbonate.

SUMMARY OF THE INVENTION

A process is disclosed for reducing the chloride and sulphate ion concentration in aqueous solutions comprising sodium chloride, sodium hydroxide, and sodium sulphate by the formation of an insoluble double salt upon the addition of sodium carbonate or bicarbonate to said aqueous solution of sodium hydroxide. The process can be conducted at ambient temperatures without the use of pressurized vessels. The double sulphate/carbonate salt crystals are easily removed by filtration as compared to sodium sulphate crystals.

DETAILED DESCRIPTION OF THE INVENTION

During the concentration by evaporation of sodium chloride and sodium hydroxide aqueous solutions obtained by the electrolysis of sodium chloride, salt crystals are formed as the solubilities of these salts are exceeded. These solids are generally removed from the aqueous slurries so formed by various means throughout the evaporation process. One of the salts removed in the purification of sodium hydroxide is sodium sulphate. Sodium sulphate solids form as long slender crystals which are very friable and as a result shatter to become very small crystals which are quite difficult to remove from solution by filtration.

The double salt of sodium carbonate and sodium sulphate is known as burkeite. It has been discovered that this double salt forms as a crystal having a fairly uniform particle size of about 1 millimeter. These crystals are not as friable as the crystals of sodium sulphate and as a result are much more easily removed from slurries in which they are present.

The sodium carbonate/sodium sulphate double salt, burkeite, has the formula:

$$Na_2CO_3 \cdot 2Na_2SO_4$$

As indicated, it contains two mol equivalents of sodium sulphate for each mol equivalent of sodium carbonate. Therefore the addition of sodium carbonate (or sodium bicarbonate) to an aqueous solution of sodium hydroxide containing sodium sulphate as an impurity would require for the formation of this double salt the addition of sodium carbonate in approximately one-half the molar quantity of sodium sulphate present in the aqueous sodium hydroxide solution.

The process of the invention can be used to purify sodium hydroxide solutions containing about 15 to about 60 percent by weight of sodium hydroxide. The sodium hydroxide solutions can contain about 0.2 to about 8 percent by weight of the sodium sulphate as impurity.

While it is preferred to utilize sodium carbonate in the formation of the double salt with sodium sulphate, sodium bicarbonate also can be used. The sodium bicarbonate, when added to the sodium hydroxide solution, reacts to form sodium carbonate and water in accordance with the equation below.

$$NaHCO_3 + NaOH \rightarrow Na_2CO_3 + H_2O$$

The sodium carbonate and bicarbonate used can be the pure or the commerically available product.

It is economically advantageous to employ aqueous sodium hydroxide solutions containing sodium carbonate or bicarbonate which are prepared at the point of use by carbonation, for example, by the use of flue gas as the source of carbon dioxide. During the carbonation reaction, sodium carbonate is first produced, which upon additional carbonation produces the sodium bicarbonate. If desired, carbonation can be continued until all of the sodium carbonate produced has been converted to bicarbonate. However, as the freezing point of solutions containing only sodium bicarbonate are higher than those containing mixtures of sodium carbonate and sodium bicarbonate, it is preferred to carry out the carbonation reaction until solutions are obtained containing weight ratios of bicarbonate to carbonate of about 5:1 to about 1:1, preferably about 5:1 to about 2:1, and most preferably about 5:1 to about 4:1.

Maximum purification of the sodium hydroxide solution with respect to removal of the sulphate ion therefrom can be obtained by the addition of at least a stoichiometric amount or an excess of sodium carbonate or sodium bicarbonate to said solution. An excess amount of sodium bicarbonate or carbonate is that amount which provides, after formation of the carbonate/sulphate double salt, burkeite, a sodium carbonate concentration of at least about 0.3 to about 1.0 grams per liter. It is preferable to use at least a stoichiometric amount of sodium carbonate based upon the formula:

$$Na_2CO_3 + 2Na_2SO_4 \rightarrow Na_4CO_3(SO_4)_2$$

When using sodium bicarbonate in the formation of the darbonate/sulphate double salt, a molar amount of sodium bicarbonate added to a sodium hydroxide solution will produce an equivalent molar amount of sodium carbonate in accordance with the equation above.

The formation and removal of the carbonate/sulphate double salt can be carried out in sodium hydroxide aqueous solutions at, for example, temperatures in the range of about ambient temperature to about the boiling point of the sodium hydroxide solution, however the lower temperature limit is not critical and lower temperatures can be used if desired provided the solution remains unfrozen. The formation of the double salt is carried out at atmospheric pressure.

The following examples illustrate the various aspects of the invention but are not intended to limit its scope. Where not otherwise specified throughout this specification and claims, temperatures are given in degrees centigrade, and parts, percentages, and proportions are by weight.

EXAMPLE 1

Studies were performed to determine particle size growth in aqueous sodium hydroxide solutions. In these studies, an aqueous sodium hydroxide solution containing 50 percent by weight sodium hydroxide was prepared which contained 4 weight percent sodium chloride and the remainder distilled water. To this solution there were added various chemical compounds chosen from among those identified as being present in electrolytic cell effluent. The slurries were concentrated by heating while being stirred at a temperature of 140° C. The heat source was removed thereafter and the solutions were cooled over a four hour period to a temperature of 20° C., during which time the solutions were continuously stirred. When the solutions reached 20° C., the salt was removed by filtration and analysed for particle size (crystal size) using a Coulter counter.

In a solution containing 50 percent by weight sodium hydroxide, 4 percent by weight sodium chloride, 4,000 parts per million sodium sulphate, and the remainder distilled water, solids after cooling were found to have an average particle size of 102 microns (0.102 millimeters). To this solution there were added 50 parts per million by weight of calcium chloride. No change in particle diameter occurred. Thereafter there were added 20 parts per million by weight of magnesium chloride. No change in particle size was seen subsequent to this addition. An additional 20 parts per million by weight of magnesium chloride was added, no change in particle size was found. Thereafter sodium carbonate in the amount of 40 parts per million by weight was added to the solution containing 50 parts by weight of calcium chloride and 40 parts by weight of magnesium chloride. The particle size was found to have increased from 102 microns to 129 microns. This represents an increase of 26 percent in particle size and would allow greater ease in removal of such particles.

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A process for reducing sulphate ion concentration in an aqueous solution comprising sodium hydroxide by treating said aqueous solution with at least one of a sodium carbonate or bicarbonate so as to form an insoluble sodium carbonate-sodium sulphate double salt having the formula:

$Na_2CO_3 \cdot 2Na_2SO_4;$ removing said insoluble double salt from said aqueous solution; and recovering a purified aqueous solution of sodium hydroxide.

2. The process of claim 1 wherein an excess of sodium carbonate or bicarbonate is added to said sodium hydroxide solution wherein said excess is that amount which provides, after formation of said insoluble sodium carbonate-sodium sulphate double salt, a sodium carbonate or bicarbonate concentration of at least about 0.3 to about 1.0 gram per liter.

3. A process for reducing chloride and sulphate ion concentration in an aqueous concentrated solution comprising sodium hydroxide, sodium chloride, and sodium sulphate which comprises:

(A) adding at least one of sodium carbonate or bicarbonate to said aqueous concentrated solution in at least a stoichiometric amount based upon the concentration of sodium sulphate present therein in accordance with the formulas:

$Na_2CO_3 + 2Na_2SO_4 \rightarrow Na_4CO_3(SO_4)_2$ and $NaHCO_3 + NaOH \rightarrow Na_2CO_3 + H_2O,$ (B) forming an insoluble sodium carbonate-sodium sulphate double salt;
(C) removing said insoluble salt and said sodium chloride from said aqueous solution; and
(D) recovering a purified aqueous solution of sodium hydroxide.

4. The process of claim 3 wherein an excess of at least one of sodium carbonate or bicarbonate is added to said aqueous concentrated solution wherein said excess is that amount which provides, after formation of said insoluble sodium carbonate-sodium sulphate double salt, a sodium carbonate and/or bicarbonate concentration of at least about 0.3 to about 1.0 gram per liter.

* * * * *